(12) United States Patent
Sasaki et al.

(10) Patent No.: US 7,486,064 B2
(45) Date of Patent: Feb. 3, 2009

(54) UNDER VOLTAGE LOCK OUT CIRCUIT AND METHOD

(75) Inventors: Yoshikazu Sasaki, Kyoto (JP); Tetsuro Hashimoto, Kyoto (JP); Isao Yamamoto, Kyoto (JP)

(73) Assignee: Rohm Co., Ltd. (JP)

( * ) Notice: Subject to any disclaimer, the term of this patent is extended or adjusted under 35 U.S.C. 154(b) by 84 days.

(21) Appl. No.: 11/800,644

(22) Filed: May 7, 2007

(65) Prior Publication Data

US 2007/0263419 A1    Nov. 15, 2007

(30) Foreign Application Priority Data

May 9, 2006   (JP) .................. JP2006-129866

(51) Int. Cl.
*H02H 3/24*     (2006.01)
*G05F 5/00*     (2006.01)

(52) U.S. Cl. ............... 323/299; 323/276; 323/281; 323/901; 361/92

(58) Field of Classification Search .......... 323/276, 323/280, 281, 284, 285, 299, 303, 349, 901; 361/18, 86, 90, 92
See application file for complete search history.

(56) References Cited

U.S. PATENT DOCUMENTS

| | | | | |
|---|---|---|---|---|
| 4,941,076 A | * | 7/1990 | Diaz | 363/49 |
| 5,266,884 A | * | 11/1993 | Agiman | 323/284 |
| 5,289,046 A | * | 2/1994 | Gregorich et al. | 307/66 |
| 5,391,932 A | * | 2/1995 | Small et al. | 307/125 |
| 5,563,526 A | * | 10/1996 | Hastings et al. | 326/37 |
| 5,739,680 A | * | 4/1998 | Lim et al. | 323/313 |
| 5,757,210 A | * | 5/1998 | Sanzo | 327/63 |
| 6,600,639 B1 | * | 7/2003 | Teo et al. | 361/92 |
| 7,298,187 B2 | * | 11/2007 | Zhu et al. | 327/143 |
| 7,310,251 B2 | * | 12/2007 | Yang et al. | 363/56.09 |
| 7,336,060 B2 | * | 2/2008 | Ito | 323/299 |

FOREIGN PATENT DOCUMENTS

| | | |
|---|---|---|
| JP | 2004-22947 | 1/2004 |
| JP | 2004-126922 | 4/2004 |

\* cited by examiner

*Primary Examiner*—Gary L Laxton
(74) *Attorney, Agent, or Firm*—Cantor Colburn LLP

(57) ABSTRACT

A voltage comparison unit compares a battery voltage with a predetermined threshold voltage, and outputs a comparison signal. A sequence circuit receives the comparison signal and a start-up signal instructing start-up of equipment mounted with a UVLO circuit, and executes a predetermined sequence when start-up is instructed by the start-up signal in a state the battery voltage is higher than the threshold voltage. A voltage control unit switches the threshold voltage based on the comparison signal and the start-up signal.

15 Claims, 5 Drawing Sheets

UNDER VOLTAGE LOCK OUT CIRCUIT AND METHOD

BACKGROUND OF THE INVENTION

1. Field of the Invention

The present invention relates to an under voltage lock out technique of monitoring the input voltage and preventing malfunction of circuits and devices in an under voltage condition.

2. Description of the Related Art

A great number of electronic circuits such as CPU (Central Processing Unit) and other DSP (Digital Signal Processor) which perform digital signal processing, liquid crystal panel and other analog circuits are mounted on recent various electronic equipments such as a mobile phone, a PDA (Personal Digital Assistant), a laptop computer and the like. The electronic circuits operate with power supplied from a battery or a power supply circuit for stabilizing the battery voltage.

A stable operation guaranteed voltage is defined for each electronic circuit, and the relevant electronic circuit does not operate properly if the supplied voltage is lower than the stable operation guaranteed voltage. Therefore, an under voltage lock out (hereinafter referred to as UVLO) function of monitoring the battery voltage and the like and controlling the start-up and terminating sequences of each electronic circuit is installed in such electronic equipment. Related arts are disclosed in Japanese Patent Application Laid-open Nos. 2004-22947 and 2004-126922 and the like.

[Patent Document 1] Japanese Patent Application Laid-open No. 2004-22947

[Patent Document 2] Japanese Patent Application Laid-open No. 2004-126922

The UVLO circuit compares the voltage to be monitored (hereinafter also referred to as monitored voltage) such as the battery voltage with a predetermined threshold voltage, executes a predetermined start-up sequence when the battery voltage becomes higher than a threshold voltage, and executes a predetermined terminating sequence when the battery voltage becomes lower than the threshold voltage. Japanese Patent Application Laid-open No. 2004-22947 discloses a technique of providing hysteresis characteristic to the threshold voltage, thereby the circuit is started up when the monitored voltage becomes equal to or higher than a predetermined value, and is stopped when the monitored voltage becomes a minimum value of the hysteresis characteristic.

The inventors have reviewed the conventional UVLO circuit having hysteresis characteristic and have come to realize the following problems.

FIG. 1 is a time chart for describing the problems of the UVLO circuit having hysteresis characteristic. FIG. 1 shows a battery voltage (monitored voltage) Vbat, a threshold voltage Vth, a UVLO signal S_UVLO representing the determination result on whether or not the battery voltage satisfies a predetermined level, and a power ON signal PWR_ON (hereinafter also referred to as start-up signal) from the outside, in this order from the top. The vertical axis and the horizontal axis of FIG. 1 and FIG. 4, to be hereinafter described, are appropriately enlarged or reduced for easier understanding, and each illustrated waveform is also simplified for the sake of facilitating the understanding.

The battery voltage Vbat gradually rises while charging and drops as the load is driven consuming the power. The battery voltage Vbat is compared with the threshold voltage Vth, and the comparison result is generated as the UVLO signal S_UVLO signal. In FIG. 1, the UVLO signal S_UVLO becomes high level when Vbat>Vth is satisfied.

The threshold voltage Vth has hysteresis characteristic in which the value changes according to the logic value of the UVLO signal S_UVLO, where the threshold voltage Vth is set to a first voltage value Vth1 when the UVLO signal S_UVLO is high level and the threshold voltage Vth is set to a second voltage value Vth2 when the UVLO signal S_UVLO is low level. The first voltage value Vth1 is set to a lower limit of a voltage range in which a circuit controlled by the UVLO circuit can transit from a non-start-up state to a start-upstate. The second voltage value Vth2 is set corresponding to a lower limit of a voltage range in which the circuit cannot transit from the non-start-up state to the start-up state, but can operate.

The UVLO circuit executes a predetermined start-up sequence when the start-up signal PWR_ON becomes high level in a state where the UVLO signal S_UVLO is high level, that is, in a state where the battery voltage Vbat is higher than the threshold voltage.

The threshold voltage Vth is set to the first voltage value Vth1 before time t0. As the battery voltage Vbat rises through charging and becomes to satisfy Vbat>Vth1 at time t0, the UVLO signal S_UVLO becomes high level, and the threshold voltage Vth transits to the second voltage value Vth2. When the start-up signal PWR_ON instructing the start-up of the electronic equipment becomes high level while the UVLO signal S_UVLO is high level, the UVLO circuit executes a predefined sequence to operate the electronic equipment (time t1), so that the electronic equipment is in the operating state. This is the normal start-up sequence. Thereafter, when the start-up signal PWR_ON becomes low level the UVLO circuit executes a predetermined terminating sequence.

Assume a case in which the battery voltage Vbat drops to a voltage between the first voltage value Vth1 and the second voltage value Vth2 through discharge, as shown in time t3 to t4. The UVLO circuit triggers a problem in such case. The UVLO signal S_UVLO is maintained at high level until the battery voltage Vbat drops to the second voltage value Vth2. Therefore, the threshold voltage Vth is also maintained at the second voltage value Vth2.

In the above-described state, when the start-up signal PWR_ON becomes high level and start-up is instructed at time t5, the UVLO circuit executes the predetermined start-up sequence. However, even if the start-up sequence is executed, the load circuits such as CPU may not be started up and may not operate correctly since the battery voltage Vbat is lower than the first voltage value Vth1.

SUMMARY OF THE INVENTION

In view of the above problems, a general purpose of the present invention is to provide an under voltage lock out circuit for appropriately executing the start-up sequence according to the state of the monitored voltage.

One embodiment of the present invention relates to an under voltage lock out circuit which monitors an input voltage and executes a predetermined sequence when the input voltage satisfies a predetermined condition. The under voltage lock out circuit includes a voltage comparison unit which compares the input voltage and a predetermined threshold voltage, and outputs a comparison signal; a sequence circuit which receives the comparison signal output from the voltage comparison unit and a start-up signal instructing start-up of an equipment mounted with the under voltage lock out circuit, and executes a predetermined sequence when start-up is instructed by the start-up signal in a state the input voltage is higher than the threshold voltage; and a voltage control unit which switches the threshold voltage based on the comparison signal and the start-up signal.

According to such embodiment, the threshold voltage is set with reference to both the comparison signal, which is the comparison result of the input voltage and the threshold voltage, and the start-up signal, and thus the start-up sequence is prevented from being executed in a state where start-up is not supposed to be started up.

In another embodiment, the voltage comparison unit may include: a variable voltage source which generates the threshold voltage; and a comparator which compares the input voltage with the threshold voltage generated by the variable voltage source, and outputs a comparison signal of a predetermined level when the input voltage is higher than the threshold voltage. Here, the voltage control unit may switch the threshold voltage generated by the variable voltage source.

In another embodiment, the voltage control unit may set the threshold voltage to either: a first voltage value or a second voltage value lower than the first voltage value according to logic values of the comparison signal and the start-up signal. For instance, a predetermined logical operation may be performed with the comparison signal and the start-up signal may be performed, and the threshold voltage can be switched between the first voltage value and the second voltage value according to the operation result. In this case, the under voltage lock out is appropriately prevented. The first voltage value may be set to a lower limit of a voltage range, in which the circuit controlled by the under voltage lock out circuit can transit from a non-start-up state to a start-up state, and the second voltage value may be set corresponding to the lower limit of a voltage range, in which the circuit cannot transit from the non-start-up state to the start-up state, but can operate.

In another embodiment, the voltage control unit may include a logic circuit which outputs a logic signal that becomes a predetermined first level when the comparison signal is at the predetermined level, that is, at a level indicating that the input voltage is higher than the threshold voltage, and start-up is instructed by the start-up signal. The voltage control unit may set the threshold voltage to the second voltage value when the logic signal is at the first level, and to the first voltage value when the logic signal is at a second level different from the first level.

In another embodiment, the voltage control unit may switch the threshold voltage in the voltage comparison unit between a state having hysteresis and a state without hysteresis, according to logic values of the comparison signal and the start-up signal. The voltage control unit may set hysteresis to the threshold voltage when start-up is instructed by the start-up signal in a state the input voltage is higher than the threshold voltage, and release the hysteresis in other states.

The start-up signal may correspond to at least a state of a power key of an equipment mounted with the under voltage lock out circuit. The start-up signal may be a signal corresponding to at least a state of whether or not a battery of an equipment mounted with the under voltage lock out circuit is being charged. The start-up signal may correspond to at least a connecting state of a connector arranged in an equipment mounted with the under voltage lock out circuit.

Another embodiment of the present invention relates to a power supply circuit, which stabilizes a power supply voltage and supplies the power supply voltage to a load. The power supply circuit may include a regulator circuit which stabilizes the power supply voltage and supply the power supply voltage to the load; and the under voltage lock out circuit according to any one of the embodiments described above which monitors the power supply voltage as an input voltage, and controls the ON/OFF sequence of the regulator circuits.

According to such embodiment, the under voltage state is appropriately detected and ON/OFF of the regulator circuit can be controlled, so that the load connected to the regulator circuits can be driven properly.

In another embodiment, the power supply circuit may have the regulator circuits and the under voltage lock out circuit may be integrated on a single semiconductor substrate. "Integrated on a single semiconductor substrate" includes a case in which all the components of the circuit are formed on the semiconductor substrate and cases in which the main components of the circuit are integrated on a single semiconductor substrate, and thereby some of the resistors, capacitors and the like for adjustment of the circuit constant may be arranged exterior to the semiconductor substrate. By integrating the power supply circuit as one LSI, the circuit area may be reduced and also the user of the power supply circuit does not need to be aware of the sequence regarding the under voltage lock out on the inside.

Still another embodiment of the present invention relates to an electronic equipment. The electronic equipment includes a battery; and a power supply circuit described above which stabilizes the voltage of the battery and supplies the voltage to the load.

According to such embodiment, the under voltage lock out may appropriately perform even if the voltage of the battery fluctuates in response to charging and discharging.

Still another embodiment of the present invention relates to an under voltage lock out method. The under voltage lock out method monitors an input voltage and executes a predetermined start-up sequence when the input voltage satisfies a predetermined condition, the method including: comparing the input voltage with a predetermined threshold voltage, and generating a comparison signal of a predetermined level when the input voltage is higher than the threshold voltage; executing a predetermined start-up sequence when a start-up signal instructing the execution of the start-up sequence becomes at a predetermined level in a state where the comparison signal is at the predetermined level; and switching the threshold voltage based on the comparison signal and the start-up signal.

The under voltage lock out method of one embodiment may further include: setting the threshold voltage to either a first voltage value or a second voltage value lower than the first voltage value according to logic values of the comparison signal and the start-up signal. Moreover, the method may further include a step of switching between a state the threshold voltage has hysteresis and a state the threshold voltage does not have hysteresis based on the comparison signal and the start-up signal.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
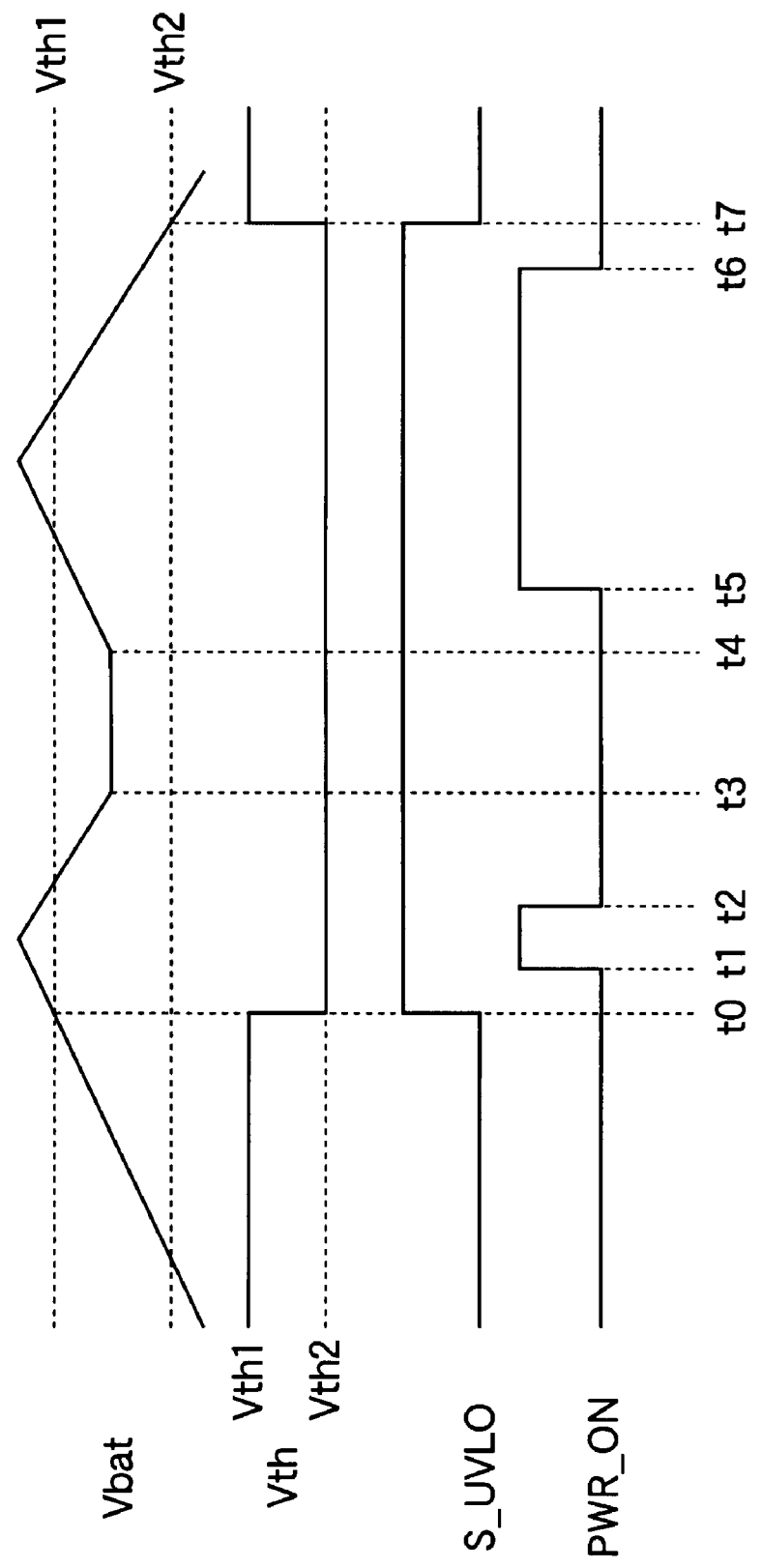
FIG. 1 is a time chart describing problems of a UVLO circuit having hysteresis characteristic.

The invention will now be described based on preferred embodiments which do not intend to limit the scope of the present invention but exemplify the invention. All of the features and the combinations thereof described in the embodiment are not necessarily essential to the invention.

The under voltage lock out circuit according to the embodiment of the present invention will now be described with reference to drawings. The same reference characters are denoted for the same or equivalent components, members, processes shown throughout the drawings, and descriptions will not be repeated.

Figure 2:
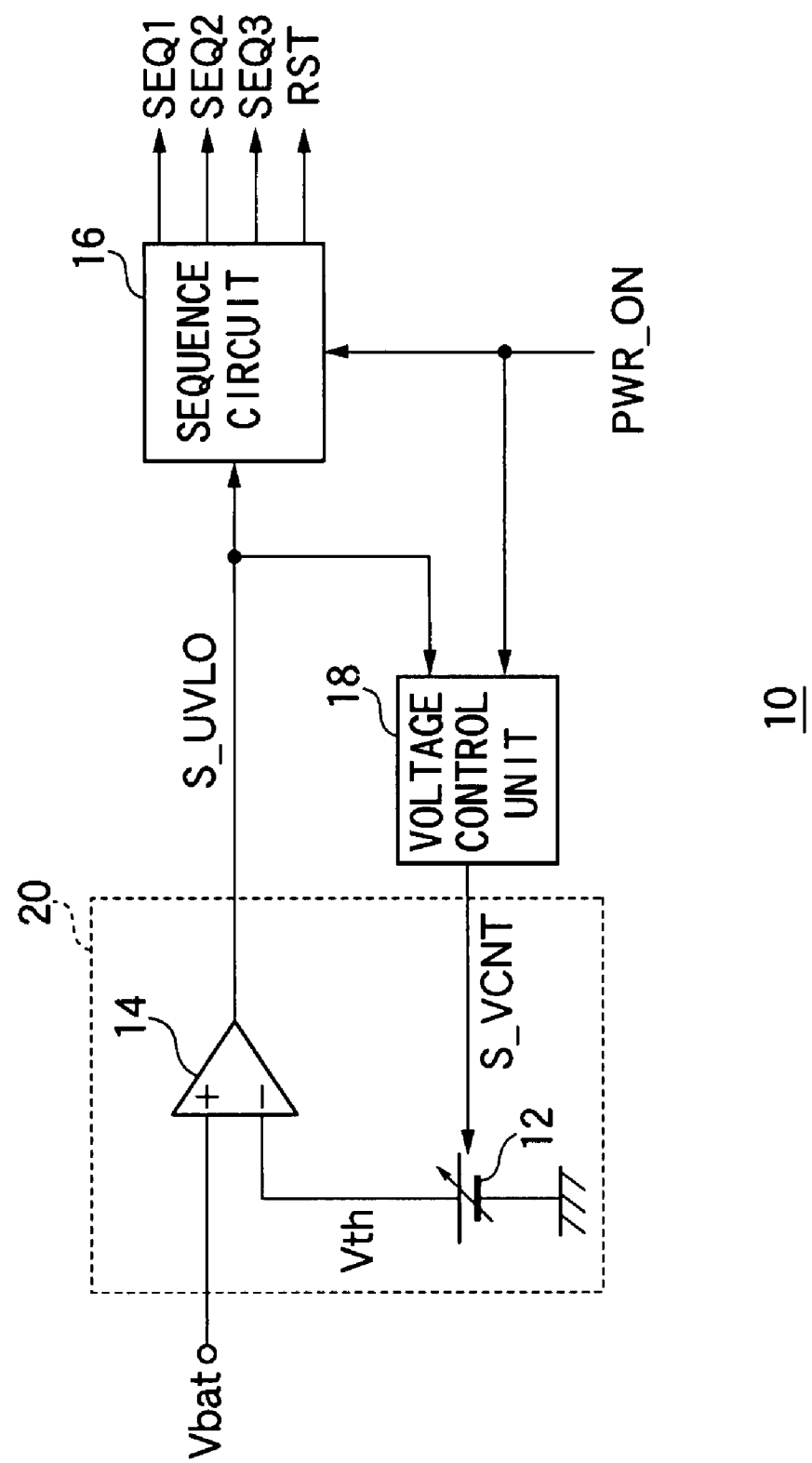
FIG. 2 is a circuit diagram showing a configuration of a UVLO circuit according to an embodiment.
Figure 3:
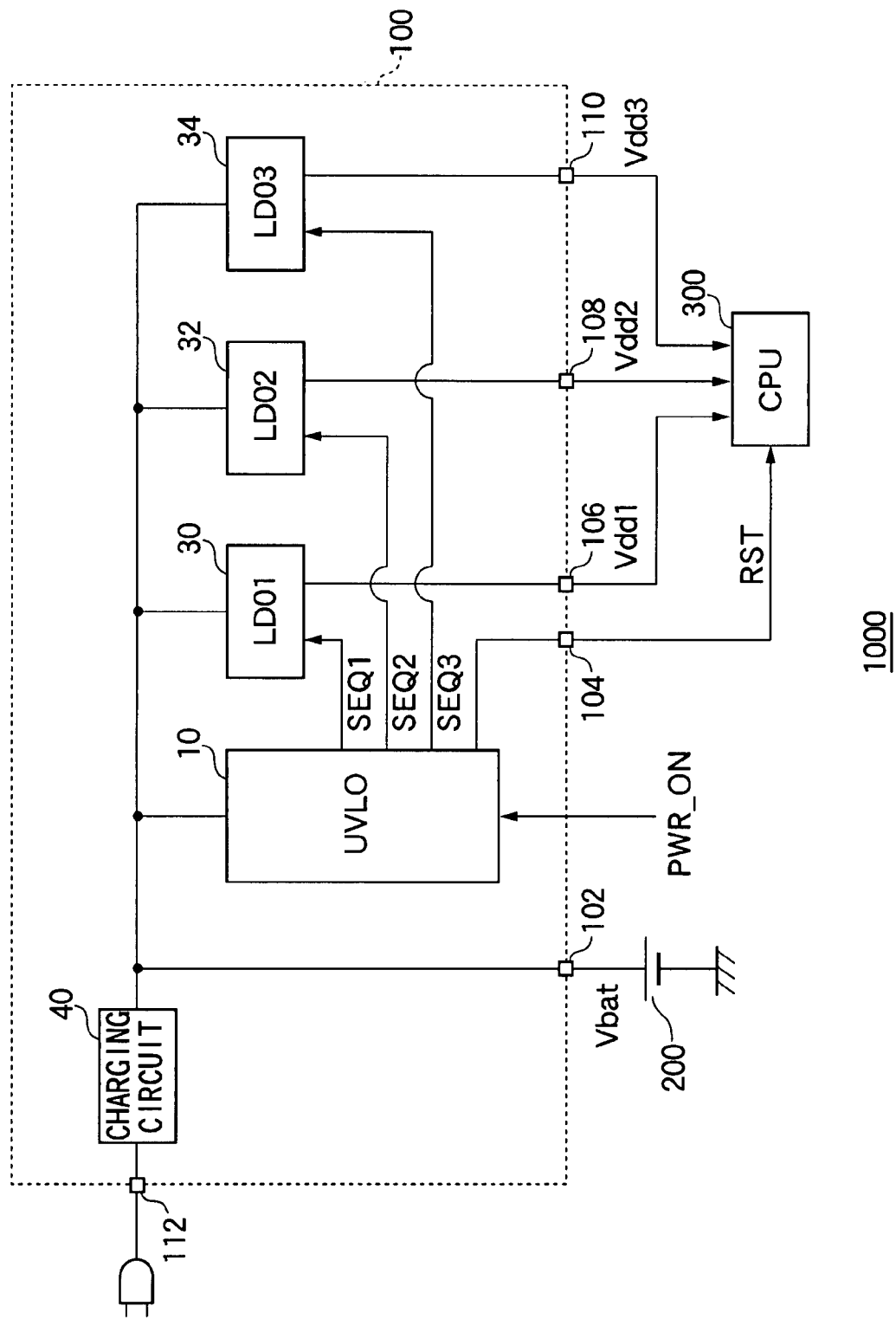
FIG. 3 is a block diagram of a power supply circuit in which the UVLO circuit of FIG. 2 is suitably used and an entire electronic equipment.

FIG. 2 is a circuit diagram showing a configuration of an UVLO circuit 10 according to the embodiment. FIG. 3 is a block diagram of a power supply circuit 100, in which the UVLO circuit 10 of FIG. 2 is suitably used, and the entire electronic equipment 1000. First, the configuration of the entire electronic equipment 1000 will be described with reference to FIG. 3. The electronic equipment 1000 is a battery driven type information terminal equipment such as a mobile phone terminal, a PDA, or a lap top computer. The electronic equipment 1000 includes the power supply circuit 100, a battery 200, and a CPU 300.

The CPU 300 is a processor which controls the entire electronic equipment 1000 and executes various arithmetic processes, and such CPU 300 is driven with power supply voltages Vdd1 to Vdd3 supplied by the power supply circuit 100. The power supply voltages Vdd1 to Vdd3 are hereinafter also simply referred to as power supply voltage Vdd. The CPU 300 is configured so that each circuit block may be operated with different voltage and is also configured to individually turn ON/OFF the power supply, for high efficiency operation. For instance, the power supply voltages Vdd1 to Vdd3 are each supplied to a core block, a memory block, and an input/output (I/O) block. A reset signal RST is also input to the CPU 300 from the power supply circuit 100. The reset signal RST is a signal that notifies the CPU 300 that supply of power supply voltage Vdd is completed or notifies the under voltage state from the power supply circuit 100.

The load driven by the power supply circuit 100 is actually not limited to the CPU 300, and in place thereof or in addition thereto, other DSP, a light emitting diode and the like may be driven.

The battery 200 is a secondary battery such as an Li ion battery that outputs a battery voltage Vbat of about 2V to 4.2V. The battery voltage Vbat drops through power consumption and rises through charging.

The power supply circuit 100 includes a battery terminal 102, a reset terminal 104, power supply terminals 106, 108, 110, and an AC terminal 112 as input/output terminals. The battery 200 is connected to the battery terminal 102. The reset terminal 104, and the power supply terminals 106, 108, 110 are all connected to the CPU 300. The AC terminal 112 is connected to an external power supply circuit. The external power supply circuit is a so-called AC adapter which converts a commercial AC voltage to a DC voltage.

The power supply voltage Vdd supplied to the CPU 300 needs to be stabilized at a predetermined voltage of 2V or lower. The battery voltage Vbat of the battery is about 2V to 4.2V. The power supply circuit 100 decreases the battery voltage Vbat supplied from the battery 200, stabilizes the voltage to a constant value that does not depend on the value of the battery voltage Vbat, and supplies the voltage to the CPU 300.

The power supply circuit 100 includes the UVLO circuit 10, a first regulator circuit 30, a second regulator circuit 32, a third regulator circuit 34 and a charging circuit 40. The DC voltage Vext is supplied to the charging circuit 40 when the AC adapter is connected to the AC terminal 112. In this case, the charging circuit 40 supplies the charging current to the battery 200 to charge the battery 200 up to about 4.2V.

The battery voltage Vbat is supplied to the first regulator circuit 30, the second regulator 32 and the third regulator circuit 34 via the battery terminal 102. Each of the first regulator circuit 30, the second regulator 32 and the third regulator circuit 34 is a linear regulator that decreases the battery voltage Vbat, and outputs the stabilized power supply voltages Vdd1 to Vdd3 to the CPU 300 via the power supply terminal 106, 108, 110 respectively.

The UVLO circuit 10 is input with the battery voltage Vbat serving as the input voltage, and a power ON signal (hereinafter also referred to as start-up signal) PWR_ON which level fluctuates according to the ON/OFF state of the power key of the electronic equipment 1000. The power ON signal PWR_ON is a signal instructing the start-up of the electronic equipment 1000, and thus is also referred to as a start-up signal.

The UVLO circuit 10 monitors the battery voltage Vbat, and determines whether or not the battery voltage Vbat, being monitored, satisfies a predetermined condition. The UVLO circuit 10 executes a predetermined sequence when the start-up signal PWR_ON becomes high level in a state the battery voltage Vbat satisfies the predetermined condition. In the present embodiment, the UVLO circuit 10 starts-up the first regulator circuit 30, the second regulator circuit 32, and the third regulator circuit 34 in this order when the battery voltage Vbat is higher than a predefined threshold voltage, and outputs the reset signal RST to the CPU 300 after the start-up is completed.

The UVLO circuit 10 outputs a first sequence signal SEQ1, a second sequence signal SEQ2, and a third sequence signal SEQ3 respectively to the first regulator circuit 30, the second regulator circuit 32 and the third regulator circuit 34. The UVLO circuit 10 sequentially switches the first sequence signal SEQ1 through third sequence signal SEQ3 to high level when ready to start-up. The first regulator circuit 30 to the third regulator circuit 34 starts the stabilizing operation and outputs the power supply voltage Vdd1 to Vdd3 when input with the sequence signal SEQ1 to SEQ3 of high level.

Returning again to FIG. 2, the configuration and the operation of the UVLO circuit 10 will now be described in detail. The UVLO circuit includes a voltage comparison unit 20, a sequence circuit 16 and a voltage control unit 18.

The voltage comparison unit 20 compares the battery voltage Vbat serving as the input voltage with a predetermined threshold voltage Vth, and outputs a UVLO signal (hereinafter also referred to as comparison signal) S_UVLO, which is high level when Vbat>Vth is satisfied. The threshold voltage Vth in the voltage comparison unit 20 may be appropriately switched according to the state of the power supply circuit 100. The voltage comparison unit 20 may directly compare the battery voltage Vbat with the threshold voltage Vth, or may divide the battery voltage Vbat by means of resistor and the like, and compare the divided voltage with the threshold voltage Vth. The battery voltage Vbat is assumed to be directly compared in the present embodiment.

In the present embodiment, the voltage comparison unit 20 includes a variable voltage source 12 and a comparator 14. The variable voltage source 12 is a variable voltage source that generates a predetermined threshold voltage Vth. In the present embodiment, the threshold voltage Vth can be switched between a first voltage value Vth1 and a second voltage value Vth2 set lower than the first voltage value Vth1. The first voltage value Vth1 is set to be higher than the voltage at which the CPU 300 can operate and can transit from a non-start-up state to a start-up state. The second voltage value Vth2 is set to be higher than a voltage at which the CPU 300 cannot transit from the non-start-up state to the start-up state, but can operate. Vth1>Vth2 is satisfied if the first and second voltage values are set to meet such condition. The first voltage value Vth1 and the second voltage value Vth2are appropriately set according to the voltage at which the CPU 300 can stably operate, and are set to Vth1=2.4V, Vth2=2.8V, for example.

The battery voltage Vbat serving as the input voltage and the threshold voltage Vth generated by the variable voltage source 12 are input to the comparator 14. The comparator 14 compares the battery voltage Vbat with the threshold voltage Vth, and outputs a comparison signal S_UVLO that is high level when Vbat>Vth is satisfied. The comparison signal S_UVLO is output to the sequence circuit 16 and the voltage control unit 18.

The sequence circuit 16 receives the comparison signal S_UVLO output from the comparator 14, and the start-up signal PWR_ON instructing the start-up of the electronic equipment 1000 mounted with the UVLO circuit 10. The sequence circuit 16 sets the first sequence signal SEQ1 through the third sequence signal SEQ3 to high level in this order when the start-up signal PWR_ON becomes high level in a state the UVLO signal S_UVLO is high level, that is, Vbat>Vth is satisfied thereby instructing start-up, and thereafter, sets the reset signal RST to high level.

The voltage control unit 18 switches the threshold voltage Vth generated by the variable voltage source 12 based on the UVLO signal S_UVLO and the start-up signal PWR_ON. The voltage control unit 18 outputs a logic signal (hereinafter referred to as voltage control signal S_VCNT) corresponding to the logic values of the UVLO signal S_UVLO and the start-up signal PWR_ON. The voltage control unit 18 outputs the voltage control signal S_VCNT that becomes high level when the UVLO signal S_UVLO is high level and the start-up signal PWR_ON is high level. That is, the voltage control signal S_VCNT becomes high level when the battery voltage Vbat is higher than the threshold voltage Vth, and the start-up is instructed. In the present embodiment, the voltage control unit 18 is configured to include the logic circuit, and outputs the logical product of the UVLO signal S_UVLO and the start-up signal PWR_ON as the voltage control signal S_VCNT. In a most simplified manner, the function of the voltage control unit 18 is realized by an AND gate.

The voltage control signal S_VCNT is output to the variable voltage source 12. The variable voltage source 12 sets the threshold voltage Vth to the second voltage value Vth2 if the voltage control signal S_VCNT is high level and sets the threshold voltage Vth to the first voltage value Vth1 if the voltage control signal S_VCNT is low level.

Figure 4:
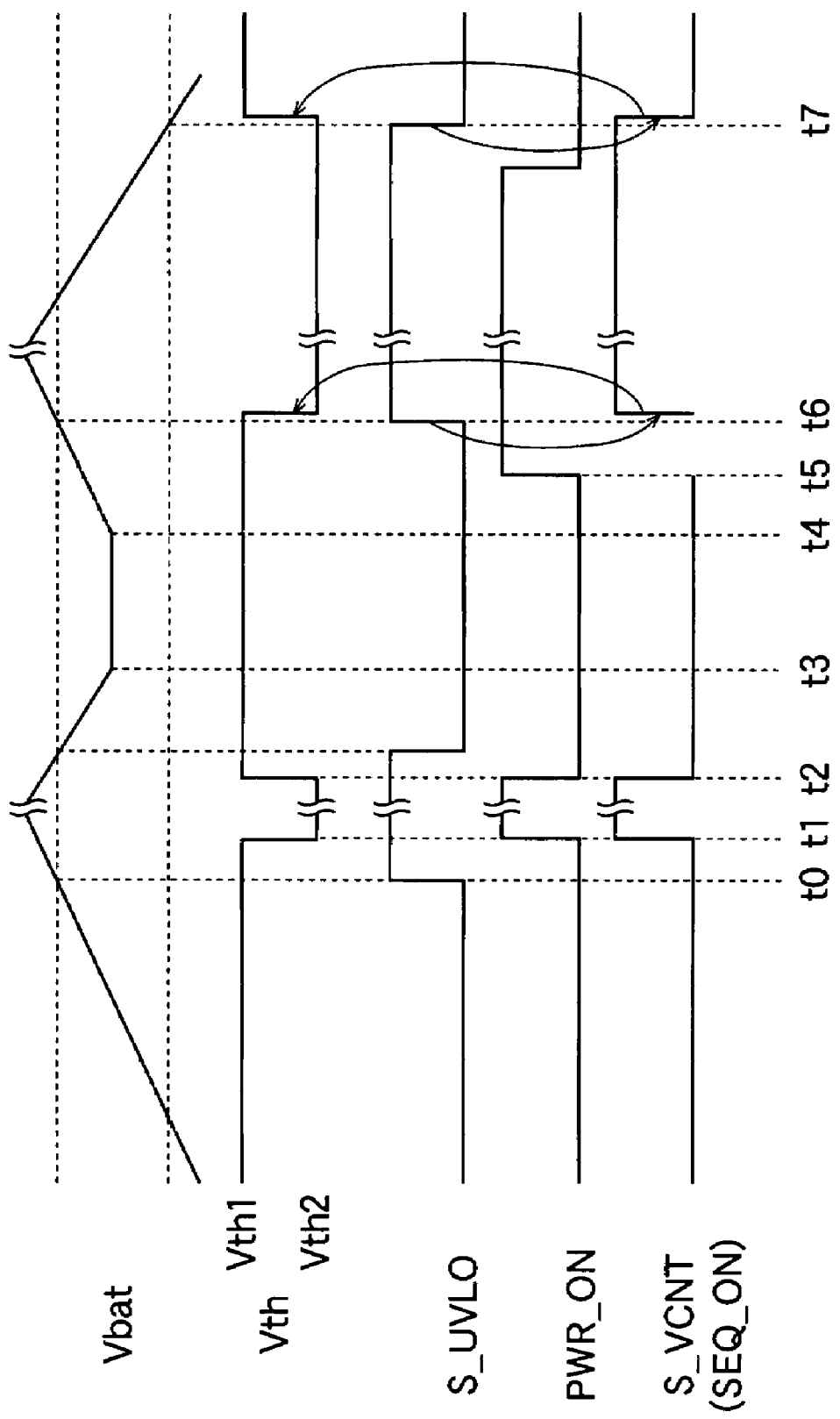
FIG. 4 is a time chart showing an operation state on start-up of the electronic equipment of FIG. 3.

The operation of the power supply circuit 100 configured as above will now be described. FIG. 4 is a time chart showing the operation state on start-up of the power supply circuit 100 including the UVLO circuit 10 of the present embodiment.

The effect of the power supply circuit 100 according to the embodiment will become clearer by comparing FIG. 4 and FIG. 1.

FIG. 4 shows the battery voltage Vbat, the threshold voltage Vth, the comparison signal S_UVLO, the start-up signal PWR_ON, and the voltage control signal S_VCNT, in this order from the top.

In the present embodiment, the threshold voltage Vth is set according to the voltage control signal S_VCNT, as described above, and is set to the second voltage value Vth2 if the voltage control signal S_VCNT is high level and is set to the first voltage value Vth1 if the voltage control signal S_VCNT is low level.

The threshold voltage Vth is set to the first voltage value Vth1 before time t0. As the battery voltage Vbat rises through charging, and becomes to satisfy Vbat>Vth1 at time t0, the comparison signal S_UVLO becomes high level. Since the start-up signal PWR_ON is low level at this point, the voltage control signal S_VCNT is maintained to be low level.

When the start-up signal PWR_ON becomes high level at time t1 while the comparison signal S_UVLO is high level, the UVLO circuit 10 sequentially sets the first sequence signal SEQ1 through the third sequence signal SEQ3 (not shown) to high level, whereby the operation of the CPU 300 starts.

When the start-up signal PWR_ON becomes high level at time t1, the voltage control signal S_VCNT also becomes high level. As a result, the threshold voltage Vth in the voltage comparison unit 20 is set to the second voltage value Vth2.

Thereafter, when the start-up signal PWR_ON becomes low level at time t2, this is notified to the CPU 300 by the reset signal RST, thereby stopping the operation of the first regulator circuit 30, the second regulator circuit 32, and the third regulator circuit 34, and stopping the power supply to the CPU 300. At time t2 , the voltage control signal S_VCNT transits to low level, and the threshold voltage Vth is set to the first voltage value Vth 1. As the battery voltage Vbat starts to drop and becomes lower than the first voltage value Vth1, the comparison signal S_UVLO becomes low level.

As shown for time t3 to t4, the battery voltage Vbat drops to a voltage between the first voltage value Vth1 and the second voltage value Vth2 through discharge. As described in FIG. 1, problem is triggered when start-up is instructed by the start-up signal in such state in the conventional UVLO circuit having hysteresis. The problem of FIG. 1 is resolved in the UVLO circuit 10 according to the present embodiment. This is described below.

In FIG. 1, that is, in the conventional UVLO circuit having hysteresis, in a state where the battery Vbat once becomes higher than the first voltage value Vth1 and thereafter drops to be in a range of Vth2<Vbat<Vth1, the threshold voltage Vth has continued to be maintained at the second voltage value Vth2, and thus the comparison signal S_UVLO has been maintained at high level.

In the UVLO circuit 10 according to the present embodiment, on the other hand, the comparison signal S_UVLO is low level in such state, as shown in FIG. 4. In this case, the sequence circuit 16 does not execute the start-up sequence since Vbat<Vth is satisfied even if the start-up signal PWR_ON becomes high level at time t5.

When the battery voltage Vbat becomes higher than the first voltage value Vth1 at time t6, the comparison signal S_UVLO becomes high level. When the comparison signal S_UVLO becomes high level, the voltage control signal S_VCNT becomes high level and the threshold voltage Vth is set to the second voltage value Vth2. As the battery voltage Vbat subsequently drops and becomes lower than the second voltage value Vth2 at time t7, the comparison signal S_UVLO becomes low level. In this case, the UVLO circuit 10 executes the terminating sequence and stops the power supply to the CPU 300, similar to at time t2.

In response to the comparison signal S_UVLO becoming low level at time t7, the voltage control signal S_VCNT becomes low level and the threshold voltage Vth is again set to the first voltage value Vth1.

Therefore, according to the UVLO circuit 10 of the present embodiment, the threshold voltage Vth is set considering to the comparison signal S_UVLO in addition to the start-up signal PWR_ON. Accordingly, the start-up sequence is prevented from being executed when the battery voltage Vbat is lower than the first voltage value Vth1, as at time t5 of FIG. 1. Furthermore, according to the UVLO circuit 10, the start-up sequence is executed immediately when it comes to time t6, at which the battery voltage Vbat becomes higher than the first voltage value Vth1, and thus the CPU 300 is reliably started up.

The operation of the UVLO circuit 10 according to the present embodiment can also be understood from a different point of view. Focusing on the behavior after time t4 in FIG. 4, the comparison signal S_UVLO transits to high level when Vbat>Vth1 is satisfied (time t6), and the comparison signal S_UVLO transits to low level when Vbat<Vth2 is satisfied (time t7). This means that hysteresis is set for the threshold voltage Vth. Focusing on the behavior in the period of time t0 to t3, the comparison signal S_UVLO transits to high level when Vbat>Vth1 is satisfied (time t0), and the comparison signal S_UVLO transits to low level when Vbat<Vth1 is satisfied (time t2). This means that hysteresis is released from the threshold voltage Vth.

Therefore, it may be understood that the voltage control unit 18 switches the threshold voltage Vth between a state having hysteresis and a state without hysteresis, according to the logic values of the comparison signal and the start-up signal. More specifically, the voltage control unit 18 sets the hysteresis for the threshold voltage Vth when the comparison signal S_UVLO is high level and the start-up is instructed by the start-up signal PWR_ON, that is, when the voltage control signal S_VCNT is high level; releases the hysteresis by invalidating the second voltage value Vth2 in other states, that is, when the voltage control signal S_VCNT is low level.

Furthermore, the following modifications are available when reconsidering the circuit of FIG. 2 from the above point of view. The voltage comparison unit 20 merely needs to be configured so as to be switched between a state the hysteresis is set and a state the hysteresis is released according to the logic values of the start-up signal PWR_ON and the comparison signal S_UVLO. This can be obtained with, the variable voltage source 12 configured as a reference voltage source for outputting a fixed voltage, and the comparator 14 configured as a hysteresis comparator. The hysteresis comparator may be realized by performing a positive feedback on the general comparator, for example. The voltage control unit 18 may switch ON/OFF the hysteresis by turning ON/OFF the positive feedback. Effects similar to the circuit of FIG. 2 are also obtained in this case as well.

Figure 5:
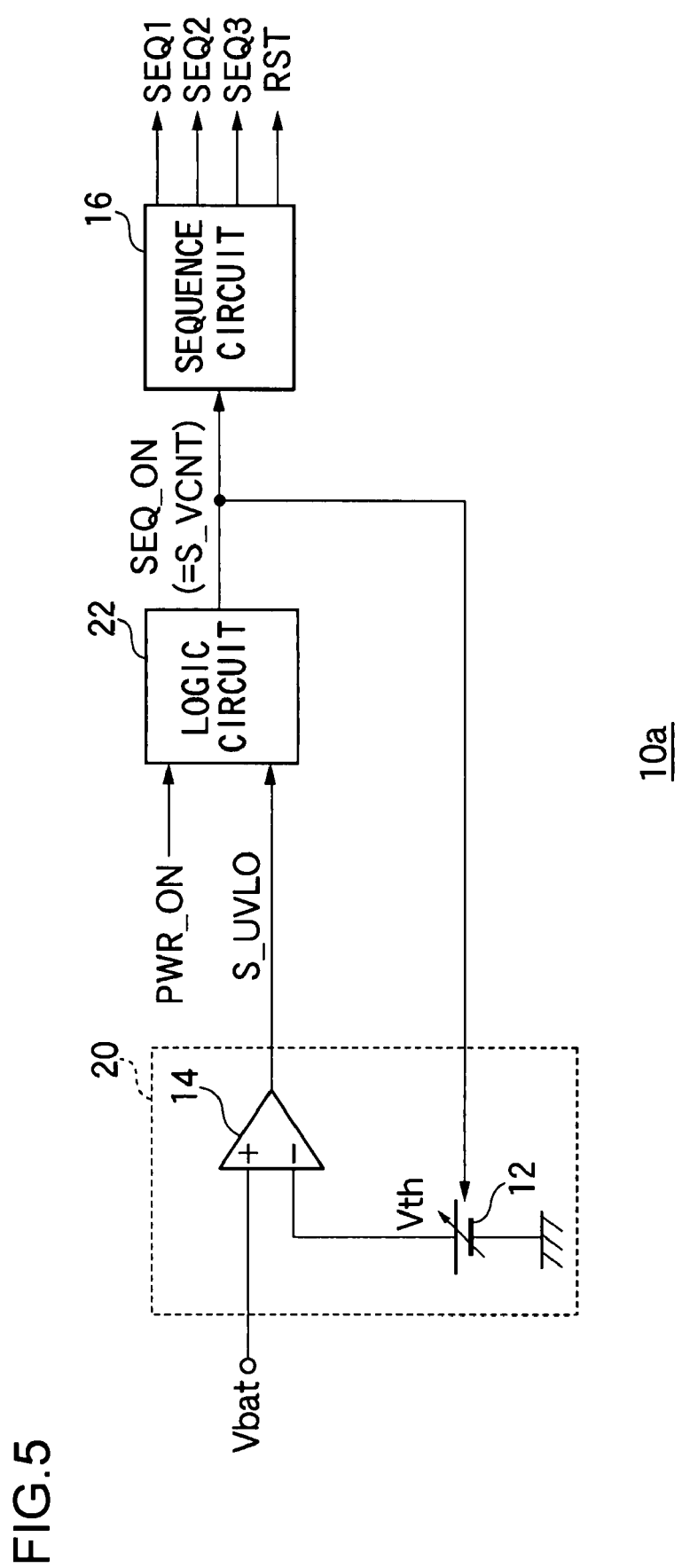
FIG. 5 is a circuit diagram showing a configuration example of the UVLO circuit other than that of FIG. 2.

As described above, the UVLO circuit 10 starts a predetermined start-up sequence at time t1 and at time t6, and executes the terminating sequence at time t2 and at time t7. Time t1 and time t6 correspond to the positive edge of the voltage control signal S_VCNT, and time t2 and time t7 correspond to the negative edge of the voltage control signal S_VCNT. Therefore, the sequence circuit 16 may execute the start-up sequence and the terminating sequence referring to the voltage control signal S_VCNT. In this regards, the voltage control signal S_VCNT may be referred to as a sequence control signal SEQ_ON. FIG. 5 is a circuit diagram showing another configuration example of the UVLO circuit. A logic circuit 22 of FIG. 5 is equivalent to the voltage control unit 18 of FIG. 2. The output of the logic circuit 22 is input to the voltage comparison unit 20 as the voltage control signal S_VCNT, and is also input to the sequence circuit 16 as the sequence control signal SEQ_ON. The sequence circuit 16 executes the start-up sequence when the sequence control signal SEQ_ON becomes high level, and executes the terminating sequence when the sequence control signal SEQ_ON becomes low level. Effects similar to the circuit of FIG. 2 are also obtained with the UVLO circuit 10a of FIG. 5.

The present invention has been described based on the embodiment, but the embodiment merely shows the principle and the application of the present invention, and it should be appreciated that various modifications and changes in arrangement may be made within the scope not departing from the technical concept of the present invention defined in the Claims.

A case of controlling the sequence of supplying the power supply voltages to the CPU 300 has been described in the embodiment, but the present invention is not limited thereto, and start-up and terminating sequences for a different circuit block may be controlled as an example.

The first regulator circuit 30 to the third regulator circuit 34 of the power supply circuit 100 may be a series regulator (LDO: Low Drop Output), or may be a switching regulator. Alternatively, the regulator circuit may be a charge pump circuit.

Moreover, the application of the UVLO circuit 10 according to the embodiment is not limited to the power supply circuit 100, and may be used in various applications for controlling the start-up sequence of other circuit blocks by monitoring the input voltage.

The input voltage monitored by the UVLO circuit 10 is not limited to the voltage output from the battery, and may be other voltages. In the embodiment, the signal PWR_ON corresponding to the state of the power key is provided as the start-up signal, but the UVLO circuit 10 may reference other start-up signals. A signal corresponding to a state of whether or not the battery 200 is being charged is an example of another start-up signal. This can be determined based on whether or not the voltage is supplied to the AC terminal 112. Furthermore, the start-up signal may be a signal corresponding to the connecting state of an extension connector to be connected with external equipment such as a hand set in the mobile phone terminal and the like. The UVLO circuit 10 may switch the threshold voltage Vth based on the signal obtained as a result of performing logical operation on a plurality of start-up signals and the comparison signal S_UVLO.

The setting of the logic values of high level and low level in the present embodiment is one example, and may be freely changed by appropriately inverting the same with an inverter and the like.

While the preferred embodiments of the present invention have been described using specific terms, such description is for illustrative purposes only, and it is to be understood that changes and variations may be made without departing from the spirit or scope of the appended claims.

What is claimed is:

1. An under voltage lock out circuit which monitors an input voltage and executes a predetermined sequence when the input voltage satisfies a predetermined condition; the under voltage lock out circuit comprising:

a voltage comparison unit which compares the input voltage and a predetermined threshold voltage, and outputs a comparison signal;

a sequence circuit which receives the comparison signal output from the voltage comparison unit and a start-up signal instructing start-up of an equipment mounted with the under voltage lock out circuit, and executes a predetermined sequence when start-up is instructed by the start-up signal in a state the input voltage is higher than the threshold voltage; and a voltage control unit which switches the threshold voltage based on the comparison signal and the start-up signal.

2. The under voltage lock out circuit according to claim 1, wherein the voltage comparison unit includes:

a variable voltage source which generates the threshold voltage; and a comparator which compares the input voltage with the threshold voltage generated by the variable voltage source, and outputs a comparison signal of a predetermined level when the input voltage is higher than the threshold voltage; and the voltage control unit switches the threshold voltage generated by the variable voltage source.

3. The under voltage lock out circuit according to claim 2, wherein the voltage control unit sets the threshold voltage to either a first voltage value or a second voltage value lower than the first voltage value according to logic values of the comparison signal and the start-up signal.

4. The under voltage lock out circuit according to claim 3, wherein the voltage control unit includes a logic circuit which outputs a logic signal that becomes a predetermined first level when the comparison signal is at the predetermined level and start-up is instructed by the start-up signal; and the voltage control unit sets the threshold voltage to the second voltage value when the logic signal is at the first level, and to the first voltage value when the logic signal is at a second level different from the first level.

5. The under voltage lock out circuit according to claim 1, wherein the voltage control unit switches the threshold voltage in the voltage comparison unit between a state having hysteresis and a state without hysteresis, according to logic values of the comparison signal and the start-up signal.

6. The under voltage lock out circuit according to claim 5, wherein the voltage control unit sets hysteresis to the threshold voltage in the voltage comparison unit when start-up is instructed by the start-up signal in a state the input voltage is higher than the threshold voltage, and releases the hysteresis in other states.

7. The under voltage lock out circuit according to claim 1, wherein the start-up signal corresponds to at least a state of a power key of an equipment mounted with the under voltage lock out circuit.

8. The under voltage lock out circuit according to claim 1, wherein the start-up signal corresponds to at least a state of whether or not a battery of an equipment mounted with the under voltage lock out circuit is being charged.

9. The under voltage lock out circuit according to claim 1, wherein the start-up signal corresponds to at least a connecting state of a connector arranged in an equipment mounted with the under voltage lock out circuit.

10. A power supply circuit which stabilizes a power supply voltage and supplies the power supply voltage to a load; the power supply circuit comprising:

a regulator circuit which stabilizes the power supply voltage and supplies the power supply voltage to the load; and the under voltage lock out circuit according to claim 1 which monitors the power supply voltage as an input voltage, and controls the ON/OFF sequence of the regulator circuit.

11. The power supply circuit according to claim 10, wherein the regulator circuit and the under voltage lock out circuit are integrated on a single semiconductor substrate.

12. An electronic equipment comprising:

a battery; and a power supply circuit according to claim 10 which stabilizes the voltage of the battery and supplies the voltage to the load.

13. An under voltage lock out method of monitoring an input voltage and executing a predetermined start-up sequence when the input voltage satisfies a predetermined condition, the method comprising:

comparing the input voltage with a predetermined threshold voltage, and generating a comparison signal of a predetermined level when the input voltage is higher than the threshold voltage;

executing a predetermined start-up sequence when a start-up signal instructing the execution of the start-up sequence becomes at a predetermined level in a state where the comparison signal is at the predetermined level; and switching the threshold voltage based on the comparison signal and the start-up signal.

14. The under voltage lock out method according to claim 13, further comprising setting the threshold voltage to either a first voltage value or a second voltage value lower than the first voltage value according to logic values of the comparison signal and the start-up signal.

15. The under voltage lock out method according to claim 13, further comprising a step of switching the threshold voltage between a state having hysteresis and a state without hysteresis based on the comparison signal and the start-up signal.

* * * * *